United States Patent
Caruel

(10) Patent No.: US 10,532,820 B2
(45) Date of Patent: Jan. 14, 2020

(54) DEVICE FOR DE-ICING THE INLET OF A NACELLE OF AN AIRCRAFT ENGINE, METHOD FOR PRODUCING SUCH A DE-ICING DEVICE, AND AIRCRAFT ENGINE NACELLE PROVIDED WITH SUCH A DE-ICING DEVICE

(71) Applicant: AIRCELLE, Gonfreville l'Orcher (FR)

(72) Inventor: Pierre Caruel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 477 days.

(21) Appl. No.: 15/153,172

(22) Filed: May 12, 2016

(65) Prior Publication Data

US 2016/0257418 A1    Sep. 8, 2016

Related U.S. Application Data

(63) Continuation of application No. PCT/FR2014/052914, filed on Nov. 14, 2014.

(30) Foreign Application Priority Data

Nov. 15, 2013    (FR) .................................... 13 61221

(51) Int. Cl.
*B64D 33/02* (2006.01)
*B64D 15/04* (2006.01)

(52) U.S. Cl.
CPC ............. *B64D 33/02* (2013.01); *B64D 15/04* (2013.01); *B64D 2033/0206* (2013.01); *B64D 2033/0233* (2013.01)

(58) Field of Classification Search
CPC ............ B64D 33/02; B64D 2033/0206; B64D 2033/0233; B64D 2033/0286
See application file for complete search history.

(56) References Cited

U.S. PATENT DOCUMENTS

| | | | |
|---|---|---|---|
| 5,088,227 A | 2/1992 | Schulze | |
| 6,267,328 B1 * | 7/2001 | Vest | ........................ B64D 15/04 239/599 |
| 6,354,538 B1 * | 3/2002 | Chilukuri | ............... B64D 15/04 244/134 B |
| 2011/0133025 A1 | 6/2011 | Vauchel | |

(Continued)

FOREIGN PATENT DOCUMENTS

| | | |
|---|---|---|
| EP | 0376371 | 7/1990 |
| EP | 1318283 | 6/2003 |

(Continued)

OTHER PUBLICATIONS

International Search Report for International Application PCT/FR2014/052917, dated Feb. 11, 2015.

*Primary Examiner* — Brian M O'Hara
*Assistant Examiner* — Keith L Dixon
(74) *Attorney, Agent, or Firm* — Burris Law, PLLC

(57) ABSTRACT

A de-icing device is provided that includes a piccolo tube integrated with a front bulkhead for limiting an inner volume of a perforated front lip. The piccolo tube is in contact with a noise reduction cellular structure provided with perforations and hot air circulation channels delivered by the piccolo tube, the de-icing hot air being diffused through the perforations and channels of the cellular structure, on the perforations facing the front lip.

8 Claims, 5 Drawing Sheets

(56) References Cited

U.S. PATENT DOCUMENTS

2013/0263601 A1* 10/2013 Richardson ............... F02C 7/04
 60/722
2015/0377128 A1* 12/2015 Copiello ................ B64D 33/02
 415/119
2017/0008635 A1* 1/2017 Mackin .................. B64D 33/02

FOREIGN PATENT DOCUMENTS

| EP | 2607655 | 6/2013 |
| FR | 2912781 | 8/2008 |
| FR | 2981049 | 4/2013 |

* cited by examiner

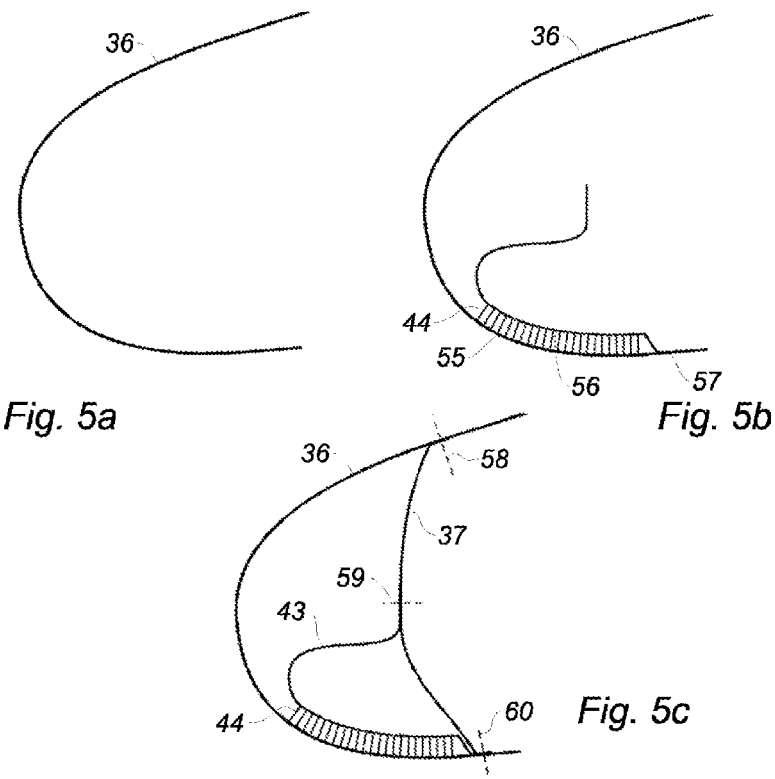
Fig. 5a
Fig. 5b
Fig. 5c
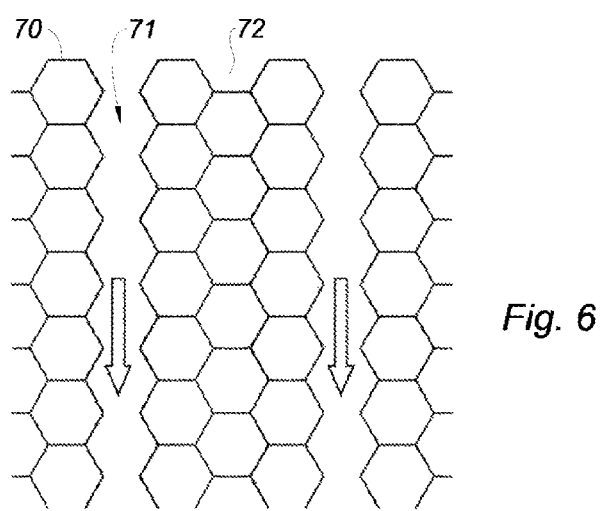
Fig. 6

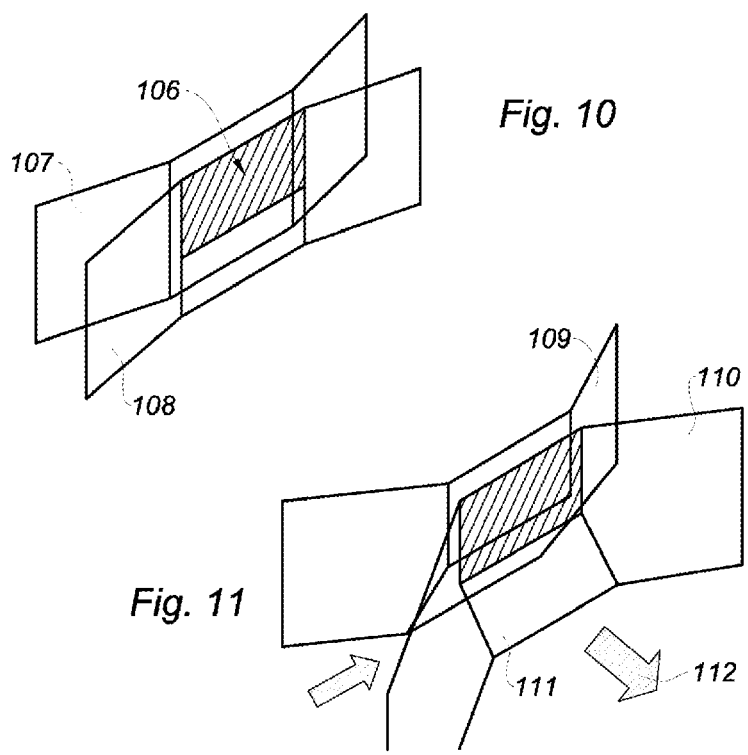

DEVICE FOR DE-ICING THE INLET OF A NACELLE OF AN AIRCRAFT ENGINE, METHOD FOR PRODUCING SUCH A DE-ICING DEVICE, AND AIRCRAFT ENGINE NACELLE PROVIDED WITH SUCH A DE-ICING DEVICE

CROSS-REFERENCE TO RELATED APPLICATIONS

This application is a continuation of International Application No. PCT/FR2014/052914, filed on Nov. 14, 2014, which claims the benefit of FR 13/61221, filed on Nov. 15, 2013. The disclosures of the above applications are incorporated herein by reference.

FIELD

The present disclosure relates to a device for de-icing an air intake of an aircraft engine nacelle. It also concerns a method for manufacturing such a de-icing device as well as an aircraft engine nacelle equipped with such a de-icing device.

BACKGROUND

The statements in this section merely provide background information related to the present disclosure and may not constitute prior art.

In the state of the art, the technical problem raised by the formation of ice on the air intake of an aircraft engine nacelle has already been solved. The technical problem is raised by the presence of a leading edge of the aircraft placed in a humid air flow path so that the pressure produced by the penetration of the leading edge in the air flow path induces the ice deposition which gradually clutters the leading edge.

A solution has in particular been described for the de-icing of a leading edge whether it is an aircraft wing or tail unit edge or a nacelle air intake lip, but whose interior is lined with a material or cellular structure for reducing acoustic noise in the document FR-A-2,912,781. In this document, a coating for the acoustic processing added at a surface of an aircraft is described, in particular at a leading edge such as an air intake of an aircraft nacelle. The coating includes an acoustically resistive layer, at least one cellular structure and a reflective layer. The cellular structure includes a plurality of ducts opening, on the one hand at a first imaginary surface, and on the other hand, at a second imaginary surface.

In this state of the art, the cellular structure comprises cutouts or orifices arranged at side walls of some ducts allowing to communicate adjacent ducts so as to create a network of communicating ducts insulating at least one duct or a group of non-communicating ducts, at least one of the communicating ducts being connected to at least one hot gas supply.

Forming cutouts and orifices in the cell walls is difficult. It is expensive to machine and it does not allow large-sized cellular structures. Furthermore, the hot air distribution in the cellular structure is not optimal which leads to increases in the hot air distribution pressure and is not always feasible.

In another known structure (see FR-A-2,981,049), piercing cutouts or orifices in the cell walls to constitute ducts is replaced by grooving of the face of the acoustic absorbent material intended to be placed on the inner surface of the skin of the nacelle which faces, at the air intake of the nacelle and inwardly of the nacelle facing the fan blades in the case of a turbojet engine. This skin is itself pierced with perforations or micro-perforations which are in fluid communication with the thus constituted grooves. In this state of the art, an annular shaped piccolo tube is supplied with hot air by a duct coming from a hot air generator or source, when a de-icing operation is controlled. The hot air is diffused through the piccolo tube, itself perforated, and enters in the grooves of the inner face of the cellular structure, it can then be diffused through the perforations or micro-perforations of the inner skin of the air intake of the nacelle. The de-icing effect is thus produced on the air intake of the nacelle.

In this other state of the art, the grooving is an improvement for the work of the cellular structure. But it is not particularly adapted to the primary distribution of hot air through the piccolo tube.

SUMMARY

The present disclosure provides a solution to the drawbacks of the state of the art. Indeed, the present disclosure concerns a device for de-icing an air intake of an aircraft engine nacelle. The de-icing device is of the kind comprising a hot air generator or source connected by at least one duct to a piccolo tube disposed in relation with the inner volume of a front lip of the nacelle, the front lip being provided with perforations for the flow of the de-icing hot air. At least one noise reduction cellular structure is disposed on at least one portion of the perforated skin of the intake lip. The cellular structure is of the kind having a plurality of ducts for the circulation of the hot air diffused by the piccolo tube.

According to one form of the present disclosure, the piccolo tube has an annular profile integrated to a bulkhead for limiting the inner volume of the intake lip and provided with a plurality of perforations to carry out the diffusion of the hot air brought by one or more duct(s) from the hot air generator or source through said limiting bulkhead and in that the cellular structure is at least partially disposed between a portion of the piccolo tube and a portion facing the inner face of the limitation skin of the air intake lip.

According to additional features:
the profile of the piccolo tube is determined depending on the shape of the front lip and/or on the limiting bulkhead so as to improve the efficiency of de-icing;
a portion facing the piccolo tube serves as a skin for limiting the noise reduction cellular structure;
the piccolo tube is supplied with de-icing hot air by at least one hot air duct connected through an aperture of the limiting bulkhead to the de-icing hot air generator or source;
the de-icing hot air generator or source is disposed in an area of the nacelle rearward of an intermediate bulkhead rearward of the front bulkhead on which the piccolo tube is integrated and in that the duct passes through apertures of said front bulkhead and of said intermediate bulkhead;
the channels for the circulation of hot air performed in the cellular structure are made on a portion at least of the height of the cells and open onto a collector disposed on the side of the inner skin of the front lip and at the rear of the cellular structure and which is connected by at least one outlet tube opening onto an aperture of the outer face of the front lip and in that the channels are disposed in areas of the cellular structure which are not provided with acoustic perforations, but release points for injecting de-icing air on the inner and/or outer skins of the cellular structure.

The present disclosure also concerns a method for manufacturing a device for de-icing an air intake section of an aircraft engine nacelle. The method mainly includes at least in forming an annular front lip provided with perforations required for the acoustic processing of the lip, in disposing a noise reduction cellular structure provided with channels for the circulation of the de-icing hot air opening into a excess hot air collector, in forming an annular piccolo tube, pierced with perforations for diffusing de-icing hot air provided by a hot air duct coming from a de-icing hot air generator or source, the piccolo tube having a profile adapted to the shape of the front lip and to the outer face of said cellular structure, in fastening the piccolo tube by its inner edge to the lower face facing the front lip, in forming a front bulkhead for closing the inner volume of the front lip and starting from the piccolo tube and in fastening it, on the one hand by its outer and inner edges by riveting to the face facing the front lip, and on the other hand to the adapted edges facing the piccolo tube.

According to an additional feature, the manufacturing method includes forming the channels for the circulation of de-icing air and/or the excess hot air collector in which the channels open into the cellular structure by at least partially machining cell groups or by partially bonding stacked sheets for making cells so as to make, through expansion of the stack of sheets, at least one air passage channel of a determined width.

The present disclosure further concerns an aircraft engine nacelle. The nacelle includes a de-icing device for its air intake section manufactured according to a method of the present disclosure, and defined according to the teachings herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 5a to 5c represent three steps in a method for manufacturing a de-icing device according to the teachings of the present disclosure;

FIGS. 6 and 7 represent two views of a first form of a cellular structure used in the de-icing device of the present disclosure;

FIGS. 9 to 11 represent three views of a third form of a cellular structure used in the de-icing device of the present disclosure.

Figure 1:
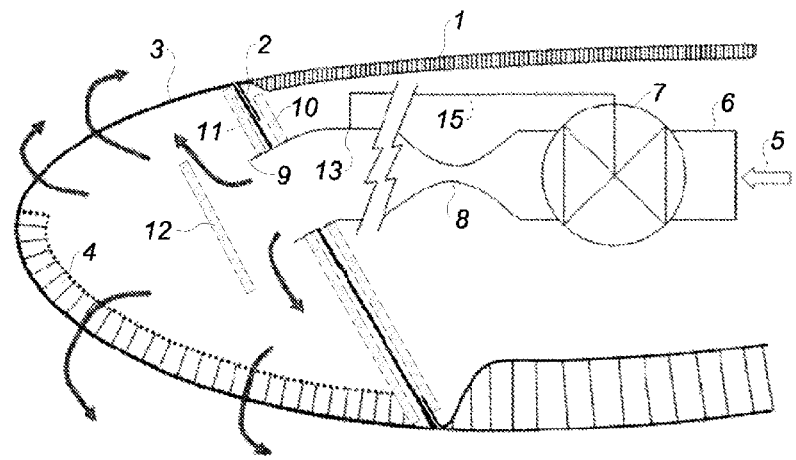
FIG. 1 represents a de-icing device according to the state of the art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, a de-icing device according to the state of the art is represented. A section of the front portion, the one which first enters the air flow path, of the aircraft engine nacelle, is represented.

In the following, because only a section of the air intake section of the nacelle is represented in the upper position, it will be written that the intake section is directed towards the front of the nacelle. The represented section is an upper section relative to a symmetry axis or longitudinal axis of the nacelle, about which the represented section rotates to generate the various described annular shapes. The indications of "upper" or "lower" refer to portions represented on the only section represented in a top position, namely respectively at the "outer" and "inner" face of the input section.

The nacelle has an axial symmetry about a central axis disposed (and not represented) under the lower face in the drawing of the drawn intake section. The intake section of the nacelle surrounds the fan of a turbojet engine (not represented) or any other intake disposition of an aircraft engine. It plays an essential role in the air supply of the aircraft engine, so that, as indicated above, the ice formation tends to reduce the air intake surface, which restricts the air flow rate and thus the engine power.

The air intake section of the nacelle includes an outer cowl 1 which is linked to a "C"-shaped front lip 3 which is itself linked to the lower portion of the drawing at an inner skin (not referenced) of the nacelle which, in the case of a turbojet engine, faces the fan. The outer cowl 1, the front lip 3 and the inner skin are provided at least partially with cellular structures, like the cellular structure 4 which is disposed on the inner face of the front lip 3, in its lower portion in the drawing, facing the longitudinal axis of the nacelle.

A front bulkhead 2 is disposed between the outer portion of the front lip 3 and the inner portion of the front lip 3, substantially at their respective links with the outer cowl 1 on the one hand, and the not referenced inner skin to the inner portion of the intake section of the nacelle on the other hand. The front bulkhead 2 has a piercing through which the aperture 9 of a de-icing hot air duct is mounted. Two thermal panels 10 and 11 are disposed on either side of the front bulkhead 2 so as to ensure a thermal isolation of the hot air blown relative to the material of the front bulkhead 2.

A third thermal panel 12 is fastened by suitable means (not represented) in front of the aperture 9 of the de-icing hot air duct, inside the volume limited by the front lip 3 and the front bulkhead 2. The mounting of the third thermal panel and its profile are calculated so as to ensure a determined diffusion of de-icing hot air throughout the volume limited by the front lip 3 and the front bulkhead 2. The blown hot air is expelled to the outside by perforations and microperforations performed on the skin of the front lip 3 and on the cellular structure 4 so that the de-icing hot air is expelled according to the arrows represented in the drawing.

The hot air delivered by the aperture 9 of the hot air duct is delivered by a hot air generator 6-9 disposed downstream of the front bulkhead 2 and which is supplied with primary hot air by a hot air source as the air flowing in the vicinity of the aircraft engine itself or extracted from a compressor of the engine. This hot primary air 5 is taken by known means and collected in a primary hot air intake duct 6 to enter on a hot air regulator 7, an outlet tubing of which has a nozzle 8 which limits the reconditioned hot air flow rate travelling to the aperture 9 of the hot air duct connected to the inner volume of the front lip 2.

Generally, a control loop is installed for controlling the regulator which may be composed of at least one solenoid valve with a controlled flow rate. The solenoid valve serving as a regulator 7 is controlled, on the on hand, by a de-icing control signal (not represented) produced by a control member disposed at the cockpit of the aircraft and/or by a safety member detecting the occurrence of ice in the intake section of the nacelle, and on the other hand, by a signal 15 of variable aperture of the solenoid valve 6 produced by a pressure sensor 13 disposed in the vicinity of the aperture 9 the hot air duct.

To overcome the drawbacks described above, and still others, the present disclosure provides several advantageous forms. In a first form, represented in FIG. 2, the hot air generator described in the state of the art (see FIG. 1) is moved backward of the nacelle beyond the front bulkhead 37 and an intermediate bulkhead 38. Such a rearward disposition allows reducing clutter in the inner annular volume of the nacelle into a large area and furthermore, approaching the hot air generator to an area of the nacelle more easily accessible in maintenance.

To this end, the hot air duct 40 is carried between the front bulkhead 37 mounted on the rear of the front lip 36 and the intermediate bulkhead 38 mounted between the cowl 35 and the inner skin of the nacelle. The front bulkhead 37 is a bulkhead for limiting the inner volume of the front lip 36 in which the de-icing hot air will be diffused. The hot air duct 40 is mounted by its two ends on corresponding apertures of the front 37 and intermediate 38 bulkheads. On the bulkhead 38, the aperture 42 of the hot air duct 40 is provided with a support and sealing flange 41.

The front end (on the left in the drawing) of the hot air duct 40 passes through the front bulkhead 37 and debits through a piccolo tube 43 disposed in the bottom portion (closest to the longitudinal axis of the nacelle—not represented) of the inner volume of the front lip 36. The piccolo tube 43 is provided with perforations whose number, distribution and section are determined by construction. The section of piccolo tube is adapted according to the thermodynamic characteristics comprising the flow rates, the pressures of the hot air flow diffused through the piccolo tube, and to the inner geometry of the front lip in order to produce a determined profile of hot air flow rates at the perforations and micro-perforations (not referenced) performed through the front lip 36.

Such a determined profile of hot air pressures and flow rates is provided so as to make the de-icing effect improved at the intake section of the nacelle.

In the exemplary form of FIG. 2, the section of the piccolo tube 43 substantially reproduces, or follows, the inner profile of the front bulkhead 37 as it will be detailed later.

In one form, the inner face of the front lip 36 is coated with a noise reduction cellular structure 44. As in the state of the art described using FIG. 1, the cellular structure 44 is disposed on the inner portion, on the side of the longitudinal axis of the nacelle (not shown) of the intake section of the nacelle. The cellular structure thus has a lower skin in drawing in contact with the inner surface of the front lip 36 and a little higher skin in contact with the lower surface of the piccolo tube 43. It is expected that the lower surface of the piccolo tube 43 serves as an upper skin for the noise reduction cellular structure 44.

The upper skin of the noise reduction cellular structure 44 is itself provided with perforations allowing the passage of hot air flow issued from the piccolo tube. Other forms will be detailed later.

Figure 2:
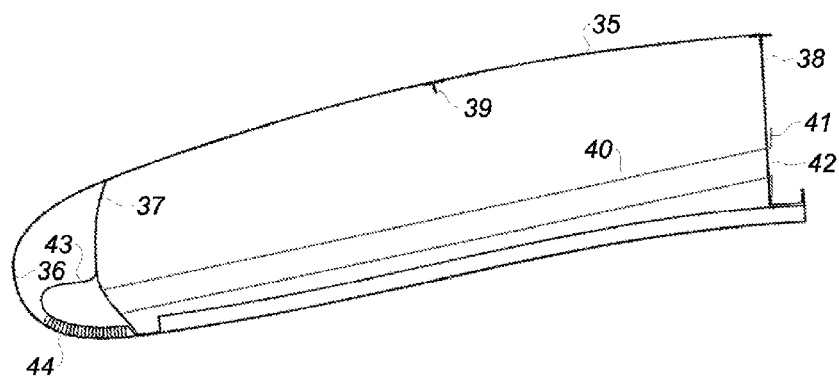
FIG. 2 represents a de-icing device according to one form of the present disclosure.
Figure 3:
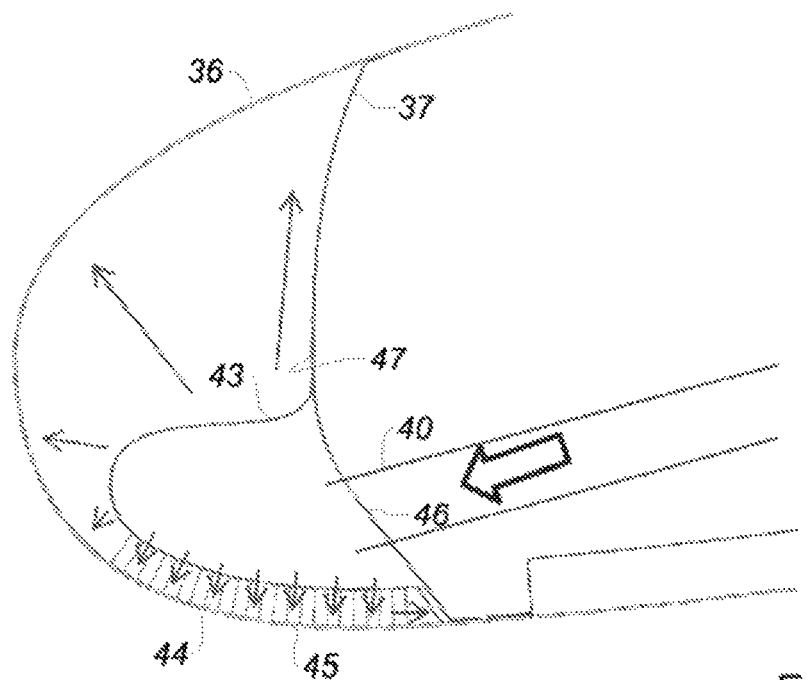
FIG. 3 represents a diagram explaining the operating mode of the de-icing device of FIG. 2.

In FIG. 3, the configuration of FIG. 2 to explain its operation is represented. In one form, the piccolo tube 43 is formed from a metal sheet, for example aluminum, titanium or a nickel alloy, according to the maximum temperature of the de-icing air. It has an upper portion 47 which comes into connection/contact with the surface facing the front bulkhead 37. The lower portion of the plate or sheet forming the piccolo tube 43 is then parallel to the noise reduction cellular structure 44 secured to the inner face of the lower portion of the front lip 36. The hot air coming from the hot air duct 40 passes through an aperture 46 performed in the front bulkhead 37, fills the inner volume of the piccolo tube 43 and is diffused through perforations according to the arrows indicated in FIG. 3 through cells 45 of the cellular structure 44.

In another form, the hot air is discharged from the cellular structure 44 through the perforations (not represented) of the lip 36.

It is understood from the foregoing that the piccolo tube 43 forms a ring disposed against and integrated to the front bulkhead 37 inside the volume of the front lip 36, about the longitudinal axis of the nacelle (not represented in the section shown in the drawings). Similarly, a single hot air duct 40 is represented. Several ducts similar to the duct 40 can be disposed as required about the longitudinal axis of the nacelle so as to provide an adequate supply of hot air while remaining within the scope of the present disclosure.

Figure 4:
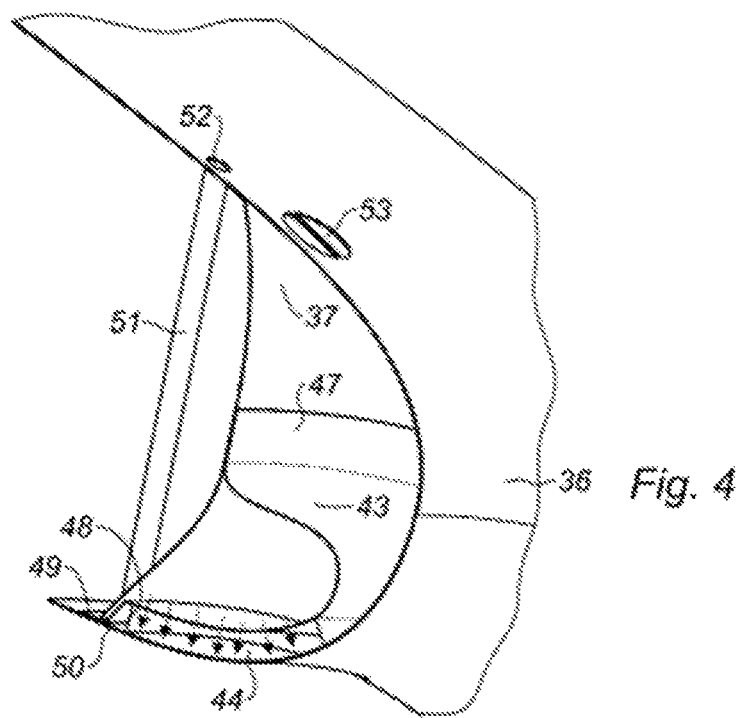
FIG. 4 represents a detail of another de-icing device according to another form of the present disclosure.

In FIG. 4, another form of the de-icing device according to the present disclosure is represented. The view is that of a section partially viewed in perspective, in the space of the upper portion of the nacelle, substantially sectioned by a vertical plane passing through the longitudinal axis of the nacelle (not represented). The same elements as those of FIGS. 3 and 4 have the same reference numbers.

The front lip 36 has been represented with the front bulkhead 37 and partially the cellular structure 44. The rear portion of the cellular structure 44 includes an empty annular chamber 50 which serves as a collector to the blown hot air from the piccolo tube 43 through the cellular structure 44. A collector tube 51 allows releasing this hot air to the outside through an orifice 52, performed on the upper face of the front lip 36, to which a top end of the outlet tube 51 is connected.

The other end, or bottom end, of the tube 51 is in communication through the front bulkhead 37 and the lower edge or foot 49 of the piccolo tube 43 with the annular chamber or collector 50.

A perforation 53 is also represented on the upper portion of the front lip, composed of two halves of a same circular aperture which communicate the inner volume of the front lip with the outside air.

In FIGS. 5a to 5c, several steps of a method for manufacturing a de-icing device for an intake section of an aircraft engine nacelle according to the present disclosure, are represented.

In FIG. 5a, an initial step from which a front lip 36 is formed is represented. To simplify, only the upper section of the front lip is represented and the entire shape is substantially obtained by rotation about the longitudinal axis (not represented) of the nacelle. The front lip 36 is formed by any known means according to the used material, and in particular by turning or stamping an aluminum or titanium sheet.

In FIG. 5b, a subsequent step of the manufacturing process at the end of which the cellular structure 44 has been attached, for example by being soldered or welded or bonded on the inner face 55 of the front lip 36, is represented. Then, after forming the piccolo tube 43, the latter, provided with its perforations is secured to the upper skin 56 of the cellular structure 44. Furthermore, the inner edge 57 of the piccolo tube 43 is fastened to the inner face 55 of the front lip 36.

The forming of the piccolo tube 43 can be achieved by different methods comprising turning, stamping, super-plastic deformation and hot forming, among others.

In FIG. 5c, a subsequent step of the manufacturing method of the present disclosure is represented. After forming the front bulkhead 37 or limiting bulkhead of the inner volume of the front lip 36, the latter is mounted inside the front lip 36 from the rear (to the right in the drawing). A bent rim of the front bulkhead 37 is then attached, for example by being riveted in 58 on the upper skin of the front lip 36. The upper edge of the piccolo tube 43 is then also attached, for example by being riveted at 59 on the front bulkhead. A lower rim (in the drawing) of the front bulkhead 37 is attached, again for example by being riveted at 60 on the lower skin of the front lip 36 so that it remains to get other equipment of the de-icing device mounted, in particular the hot air duct(s) and the hot air generator when the front lip 36 thus equipped is mounted on the rest of the nacelle.

In FIG. 6, one form of a cellular structure for use with the piccolo tube of the invention is represented. FIG. 6 represents a section of the cells of the cellular structure 44 by a plane parallel to the upper and lower faces of the structure when it is mounted in the front lip, on the upper section represented in the preceding figures.

So as to perform a hot air passage channel between the upper skin (not represented) at the top of FIG. 6 and the lower skin (not represented) at the bottom of FIG. 6, one or more row(s) of hexagonal cells have been at least partly removed, by total or partial machining. The result is that a channel 71 is thus formed between two cell groups 70 and 72 which have been integrally preserved. The upper and lower skins of the cellular structure are then pierced with perforations or micro-perforations only to the right of the channels as the channel 71 while they are left intact at the preserved cells. However, the lower skin is acoustically processed to the right of the cell groups preserved by adapted micro-perforations. One also notes that the upper skin of the cellular structure is also performed by a corresponding portion of the piccolo tube 43 and that the lower skin of the cellular structure 43 is performed by a portion of the lower skin 45 of the front lip 36.

Figure 7:
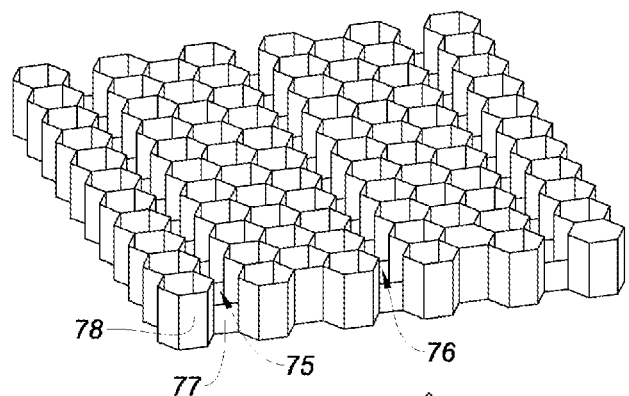

In FIG. 7, a plate of cells sectioned at the upper skin is represented in perspective, so that the channels 75 and 76 are constituted by cells which have been partially machined as the cell 77 compared to the neighboring cell 78 which has been preserved and serves as an edge for limiting the channel 75. Several hot air circulation channels are thus formed as shown.

Figure 8:
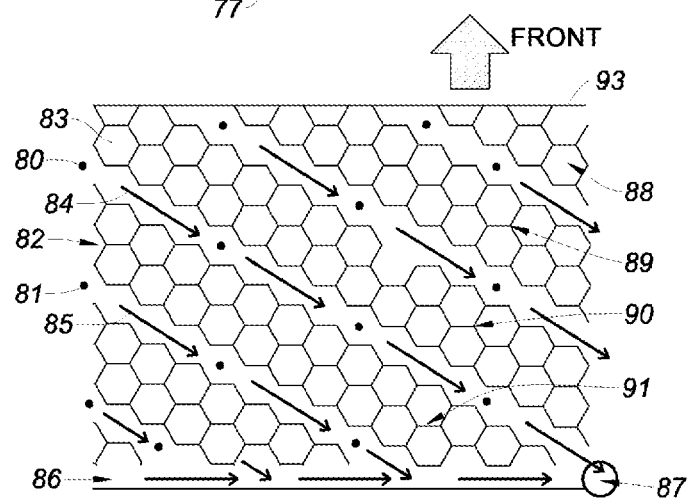
FIG. 8 represents a second form of a cellular structure used in the de-icing device of the present disclosure.

In FIG. 8, another form of the present disclosure is represented, in which the machined cells are aligned to form hot air circulation channels 84, 85 according to diagonals. The arrow labeled "FRONT" means the direction of the leading edge of the front lip when the cellular structure was mounted. The points aligned at the hot air circulation channels 84, 85 as the points 80 and 81 represent the perforations performed on the outer skin and which are thus in relation with the hot air of the piccolo tube. The density and diameter of perforations 80, 81 are determined so as to vary according to the distance from the perforation to the leading edge to adjust the thermal exchanges depending on the areas to be de-iced.

The channels 84, 85 for the circulation of hot air blown by the perforations 80, 81 from the piccolo tube are inclined/angled relative to the radial direction when the cellular structure is installed in the front lip of the nacelle. They open onto an outlet collector 86, which has been in particular represented in FIG. 4 under the reference 50. One end of the collector 86 opens into an outlet tube 87 which has already been described with the tube 51 in FIG. 4.

The four channels represented in FIG. 8 are formed by machining or otherwise removing cells or portions of cells between the cell groups limiting the channels and carrying the references 88 to 91.

Figure 9:
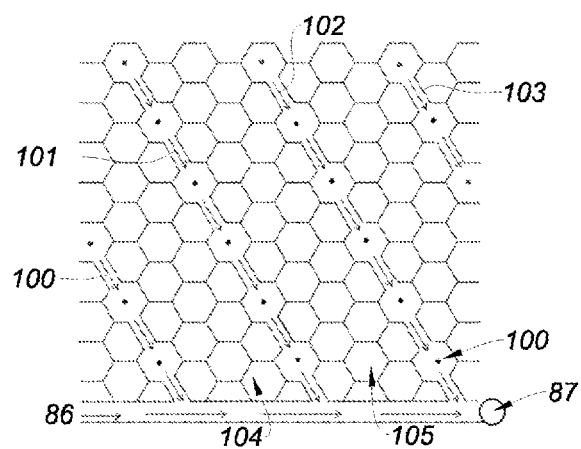

In FIG. 9, another form of the cellular structure is represented, in which hot air circulation oblique channels are pierced by another means. A collector 86 similar to the channel 86 of FIG. 8 or to the collector 50 of FIG. 4 is provided with the same tube 87 of hot air outlet, similar to the outlet tube 51 of FIG. 4.

Channels 100 to 103 are formed during the manufacture of the cells. The cells are first produced from a stack of metal sheets which carry bonded areas alternating from sheet to sheet in the stack. Thus, a bonded area in the stack is never superimposed with another immediately neighboring bonded area. Then, the stack undergoes an expansion operation so that the bonded areas remain plated in pairs.

To achieve a channel between two cell groups, the present disclosure plans not to achieve bonding between two sheets of the prior stacking of metal sheets for achieving the cellular structure. The technique will be better understood using the following FIGS. 10 and 11. But it is seen that it is possible to achieve oblique channels as the channels 100 to 103 between the front of the cellular structure directed toward the leading edge of the front lip or of the nacelle, but also to achieve channel widths variable depending on the hot air flow rates which would be brought toward the collector 86 and the outlet tube 87.

In FIG. 10, two sheets 107 and 108 of the stack of metal sheets used to achieve the cellular structure are represented. A bonded area 106 between the two sheets 107 and 108 is arranged and an expansion of the stack is executed. The ribbons on both sides of the bonded area 106 then take an angulation, or extend at angles, so that the honeycomb of hexagonal section is formed. By repeating the pattern composed of a bonded area and a free area on the entire length of the stack and by multiplying the sheets of the stack with a shift of the pattern on the different sheets of the stack, the honeycomb portion of the noise reduction cellular structure is thus produced.

In FIG. 11, to achieve hot air circulation channels delivered by the piccolo tube of the present disclosure, two sheets 109 and 110 in the stack of metal sheets are represented in an area where it is desired to produce a hot air duct or channel in the cellular structure. The bonded area represented by hatching is interrupted, so that, during the expansion represented in the direction of the arrow 112, a flap 111 which opens the duct or channel between the two sheets 109 and 110 is formed. The opening degree of the channel or duct, as well as the channel width can be adapted by arranging the length and/or width of the preserved bonded area.

Thus, it can be seen that the features of the invention allow:

- an increase in the efficiency of exchange between the hot air issued from the hot air generator and iced surfaces relative to the simple hot air circulation provided in the state of the art, the air passage sections may be improved to increase the thermal exchanges;
- a reduction in the hot air flow rate for a de-icing efficiency given with respect to the efficiency of the de-icing devices of the state of the art;
- a reduction in the mass of the components of the de-icing device of the present disclosure by integrating the piccolo tube to the cellular structure to which it serves as an upper skin;
- a possibility for de-icing with cooler air and higher flow rate since the piccolo tube allows increasing the exchanges and thereby operating at lower pressures and temperatures;
- the achievement of the front lip, the noise reduction cellular structure and/or the front bulkhead of aluminum, which leads to a reduction in costs compared with conventional solutions;
- the noise reduction cellular structure may also be bonded to the inner face of the front lip instead of being soldered, which prevents overheating during manufacturing.

What is claimed is:

1. A device for de-icing an air intake of an aircraft engine nacelle, of a kind comprising a hot air generator connected by at least one duct to a piccolo tube disposed in relation with an inner volume of a front lip of the nacelle, the front lip being provided with perforations for a flow of de-icing hot air and at least one noise reduction cellular structure disposed on at least one portion of the perforated skin of the intake lip, the cellular structure being of a kind having a plurality of channels for circulation of the hot air diffused by the piccolo tube, wherein the piccolo tube has an annular profile disposed against and integrated to a front bulkhead, wherein the front bulkhead forms a closure of the piccolo tube and limits the inner volume of the front lip and in that the piccolo tube is provided with a plurality of perforations to carry out diffusion of hot air supplied by one or more duct(s) from the hot air generator through said front bulkhead, in that the cellular structure is at least partially disposed between a portion of the piccolo tube and a portion facing an inner face of the perforated skin for limiting the front lip and in that a portion of the cellular structure facing the piccolo tube serves as a skin for limiting the noise reduction cellular structure.

2. The de-icing device according to claim 1, wherein a profile of the piccolo tube is determined depending on the shape of the front lip and/or on the bulkhead so as to improve the efficiency of the de-icing.

3. The de-icing device according to claim 1, wherein the piccolo tube is supplied with de-icing hot air by at least one hot air duct connected through an aperture of the bulkhead to the de-icing hot air generator.

4. The de-icing device according to claim 1, wherein the de-icing hot air generator is disposed in an area of the nacelle rearward of an intermediate bulkhead rearward of the front bulkhead on which the piccolo tube is integrated and in that the duct passes through apertures of said front bulkhead and of said intermediate bulkhead.

5. The de-icing device according to claim 1, wherein hot air channels formed in the cellular structure are made on a portion at least of a height of cells and open onto a collector disposed on a side of a lower skin of the front lip and at a rear of the cellular structure and which is connected by at least one outlet tube opening onto an aperture of an upper face of the front lip and in that the hot air channels are disposed in areas of the cellular structure which are not provided with acoustic perforations, but release points for injecting de-icing air on an upper skin of the cellular structure.

6. An aircraft engine nacelle having a de-icing device according to claim 1.

7. The device according to claim 1, wherein a portion of the piccolo tube forms the upper skin of the noise reduction cellular structure.

8. The device according to claim 1, wherein a portion of the front lip forms a lower skin of the noise reduction cellular structure.

* * * * *